US008058743B2

(12) United States Patent
Chen et al.

(10) Patent No.: US 8,058,743 B2
(45) Date of Patent: Nov. 15, 2011

(54) AUTOMOTIVE ELECTRICAL SYSTEM FOR COUPLING POWER CONVERTERS WITH A TRANSFORMER

(75) Inventors: Keming Chen, Torrance, CA (US); Christopher P. Henze, Lakeville, MN (US); George R. Woody, Redondo Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 438 days.

(21) Appl. No.: 12/241,398

(22) Filed: Sep. 30, 2008

(65) Prior Publication Data

US 2010/0078997 A1 Apr. 1, 2010

(51) Int. Cl.
*B60L 1/00* (2006.01)
(52) U.S. Cl. .................................................. 307/10.1
(58) Field of Classification Search ............... 307/10.1
See application file for complete search history.

(56) References Cited

U.S. PATENT DOCUMENTS

| 6,177,736 B1 | 1/2001 | Raiser |
| 6,323,626 B1 | 11/2001 | Raiser |
| 7,599,204 B2 | 10/2009 | Kajouke et al. |

*Primary Examiner* — Rexford Barnie
*Assistant Examiner* — Dru Parries
(74) *Attorney, Agent, or Firm* — Ingrassia Fisher & Lorenz P.C.

(57) ABSTRACT

Systems and/or apparatus are provided for automotive electrical systems having power converters that are coupled by using a transformer. An electrical system comprises a boost converter, wherein a first winding of a transformer is coupled between the input node of the boost converter and a first reference node. The boost converter further includes a switch coupled between the first reference node and a second reference node and a diode coupled between the first reference node and the output node of the boost converter. An energy source is coupled between the input node and the second reference node and a first electrical load is coupled between the output node and the second reference node. The electrical system further comprises a voltage converter having an input coupled to a second winding of the transformer, and a second electrical load coupled to the output of the voltage converter.

17 Claims, 1 Drawing Sheet

AUTOMOTIVE ELECTRICAL SYSTEM FOR COUPLING POWER CONVERTERS WITH A TRANSFORMER

TECHNICAL FIELD

Embodiments of the subject matter described herein relate generally to electrical systems, such as electric and hybrid vehicle drive systems. More particularly, embodiments of the subject matter relate to a boost converter configured to provide power to a vehicle traction system and an auxiliary electrical system.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

Many electric-powered vehicles require a high primary operating voltage, e.g., 400 volts DC. Typical fuel cells provide less than one volt DC under load. Therefore, a large number of individual fuel cells are often configured or "stacked" in series to provide a fuel cell stack capable of providing the high primary operating voltage required by the vehicle. Power converters, such as direct current-to-direct current (DC/DC) boost converters, are typically used to raise the voltage level of a fuel cell stack up to the level required on the high-voltage bus.

Most vehicles also include one or more auxiliary electrical systems which operate at a lower voltage. For example, most vehicles include one or more auxiliary electrical systems adapted to operate at 12 volts DC. Often, a step-down DC/DC converter (or buck converter) is used to reduce the high-voltage bus voltage down to the operating level required by the auxiliary electrical systems. Although commonplace, the use of additional power converters increases the component cost, size, and complexity of the vehicle electrical system.

BRIEF SUMMARY

An apparatus is provided for an electrical system for use in a vehicle. The electrical system comprises a transformer having a first winding and a second winding. The electrical system further comprises a boost converter, wherein the first winding of the transformer is coupled between the input node of the boost converter and a first reference node. The boost converter further includes a switch coupled between the first reference node and a second reference node and a diode coupled between the first reference node and the output node of the boost converter. An energy source is coupled between the input node and the second reference node and a first electrical load is coupled between the output node and the second reference node. A voltage converter has an input which is coupled to the second winding of the transformer, and a second electrical load coupled to the output of the voltage converter. The energy source provides energy to the first electrical load and the second electrical load when the switch is modulated.

In another embodiment, an apparatus is provided for an automotive electrical system. The automotive electrical system comprises a boost converter having an input, an output, and an inductor configured as a primary winding for a transformer. An energy source is coupled to the input of the boost converter. A voltage converter has an input coupled to a secondary winding of the transformer. A controller is coupled to the boost converter and configured to activate the boost converter to provide energy potential from the energy source to the output of the boost converter and also provide energy potential to the input of the voltage converter.

In yet another embodiment, an automotive drive system is provided. The automotive drive system comprises a boost converter. The boost converter comprises an inductive element coupled between an input node of the boost converter and a reference node, wherein the inductive element is configured as a primary winding for a transformer. The boost converter further comprises a switch coupled between the reference node and a system reference node and a diode coupled between the reference node and the output node of the boost converter. The automotive drive system further comprises a first energy source coupled between the input node of the boost converter and the system reference node. A vehicle traction system is coupled between the output node of the boost converter and the system reference node. A buck converter has an input coupled to a secondary winding of the transformer. A second energy source is coupled to the output of the buck converter. A controller is coupled to the switch of the boost converter and configured to activate the switch to provide energy from the first energy source to the vehicle traction system and the second energy source.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following FIGURE.

DETAILED DESCRIPTION

Figure 1:
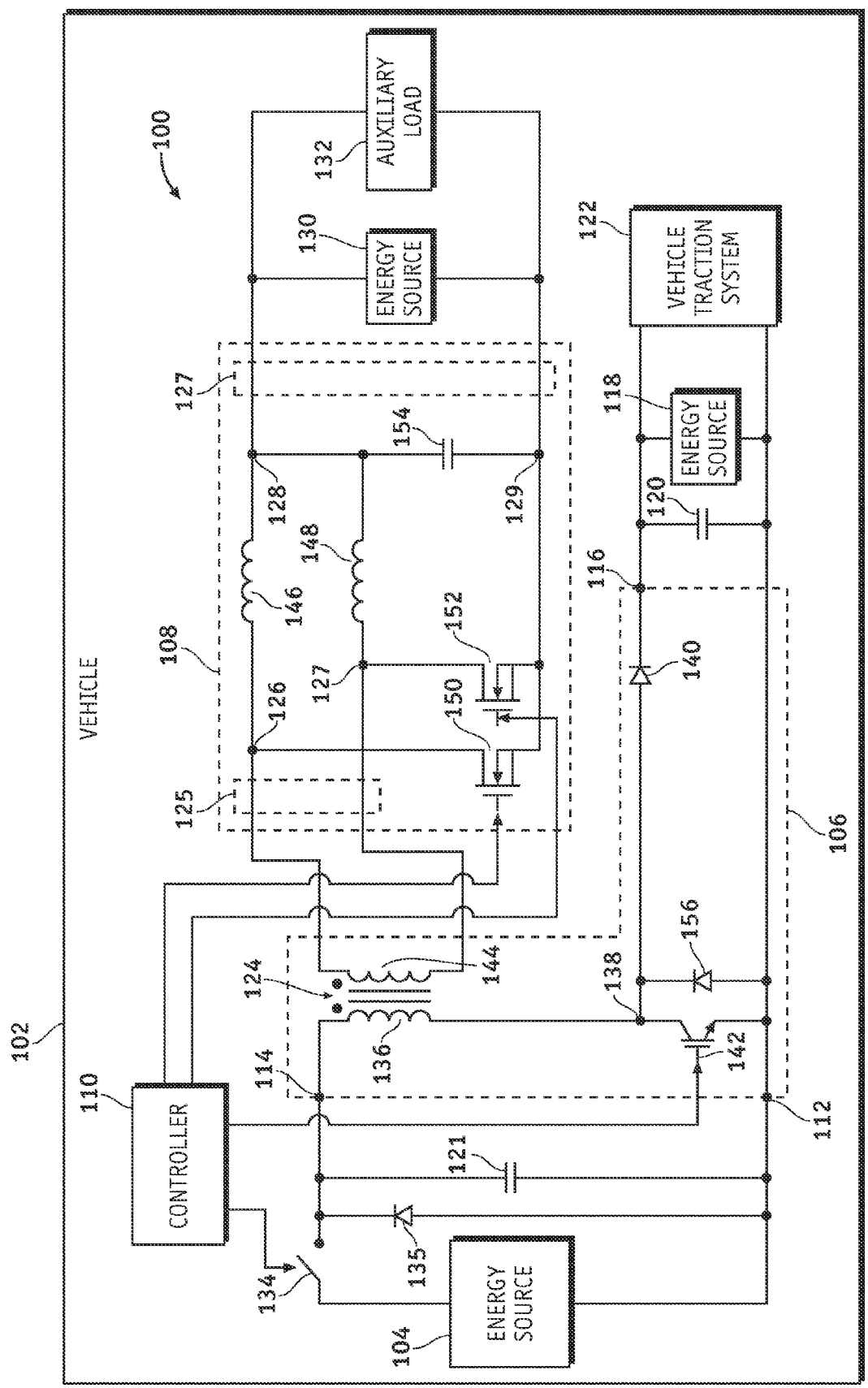
FIG. 1 is a schematic view of an electrical system suitable for use in a vehicle in accordance with one embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

In addition, certain terminology may also be used in the following description for the purpose of reference only, and thus are not intended to be limiting. For example, the terms "first", "second" and other such numerical terms referring to structures do not imply a sequence or order unless clearly indicated by the context.

For the sake of brevity, conventional techniques related to vehicle electrical systems, electric power systems, signaling, transistor-based switch control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and/or concepts described herein relate generally to electrical systems with boost converters which are utilized in automotive drive systems. The inductive element of a boost converter is configured as a primary winding for a transformer, and a secondary winding of the transformer is configured as the input to a second converter. The voltage levels at the input to the second converter and the output of the boost converter are controlled by modulating a switch in the boost converter.

Referring to FIG. 1, in an exemplary embodiment, an electrical system 100 suitable for use as part of an automotive drive system in a vehicle 102 includes, without limitation, a first energy source 104, a boost converter 106, a voltage converter 108, and a controller 110. The controller 110 is coupled to the boost converter 106 and the voltage converter 108, and is suitably configured to support operation of the electrical system 100, as described in greater detail below. In an exemplary embodiment, the electrical system 100 is configured to provide energy potential from the first energy source 104 to the input of the voltage converter 108 and the output of the boost converter 106, as described in greater detail below. It should be understood that FIG. 1 is a simplified representation of an electrical system 100 and is not intended to limit the subject matter in any way.

In an exemplary embodiment, the boost converter 106 is coupled to a reference node 112 for the electrical system 100. An input node 114 of the boost converter 106 is coupled to the first energy source 104, which in turn is also coupled to the reference node 112. More specifically, the input node 114 corresponds to the positive terminal of the first energy source 104, and the reference node 112 corresponds to the negative terminal of the first energy source 104. In an exemplary embodiment, the boost converter 106 is a DC to DC converter having an output node 116 configured to provide power to an electrical load. In an exemplary embodiment, a second energy source 118 is coupled between the output node 116 of the boost converter 106 and the reference node 112. More specifically, the output node 116 corresponds to the positive terminal of the second energy source 118, and the reference node 112 corresponds to the negative terminal of the second energy source 118. Capacitors 120, 121 may be coupled between the input node 114, the output node 116 and the reference node 112 to reduce output voltage ripple and smooth the voltages between the boost converter 106 and energy sources 104, 118, as will be appreciated in the art. In an exemplary embodiment, the second energy source 118 is capable of operating at a voltage that is high enough to drive a vehicle traction system 122, which is also coupled between the output node 116 of the boost converter 106 and the reference node 112.

In an exemplary embodiment, the boost converter 106 and the voltage converter 108 are coupled via a transformer 124. In this regard, the transformer 124 may be understood as being coupled to the input 125 of the voltage converter 108. In an exemplary embodiment, the output 127 of the voltage converter 108 is coupled to a third energy source 130. The third energy source 130 is preferably capable of operating at a voltage that is suitable for an auxiliary electrical load 132 which may be coupled to the output 127 of the voltage converter 108. As described below, in an exemplary embodiment, the voltage converter 108 is configured to operate bi-directionally, and as such, the distinction between the input 125 and the output 127 of the voltage converter 108 is primarily for reference. In the configuration shown and described in FIG. 1, the transformer 124 functions as an inductor for the main traction power system in the vehicle 102 and as a coupling transformer between the auxiliary and main power systems, as will be appreciated in the art.

As shown in FIG. 1, in an exemplary embodiment, a switch 134 is coupled between the first energy source 104 and the input node 114 of the boost converter 106. As described in greater detail below, the switch 134 is operated under control of the controller 110 during operation of the electrical system 100 to allow the vehicle traction system 122 and/or second energy source 118 to be jump started or otherwise operated using energy potential from the third energy source 130 provided by the voltage converter 108. In this regard, a diode 135 is coupled between reference node 112 and input node 114 (as shown in FIG. 1, the anode is coupled to the reference node 112 and the cathode is coupled to the input node 114) to enable current flow through the boost converter 106 when the switch 134 is open, as will be appreciated in the art.

Depending on the embodiment, the energy sources 104, 118 may each be realized as a battery, a fuel cell (or fuel cell stack), one or more capacitors (e.g., an ultracapacitor or capacitor bank), or another suitable voltage source. For the implementation described here, the second energy source 118 has a voltage greater than or equal to the first energy source 104. In an exemplary embodiment, the first energy source 104 is realized as a fuel cell stack and the second energy source 118 is realized as a high-voltage battery. In this regard, the fuel cell stack typically includes approximately 300 individual fuel cells, each of which provides approximately 0.6 volts DC under full load. The high-voltage battery has a voltage ranging from 300 volts DC to 400 volts DC, and potentially even higher, with a typical nominal voltage of approximately 360 volts DC. It will be appreciated in the art that the actual voltage of the battery will vary over time depending on, among other variables, the state of charge of the battery and load conditions.

In an exemplary embodiment, the boost converter 106 is a step-up DC to DC converter. An inductive element 136 is coupled between the input node 114 of the boost converter 106 and a node 138. A diode 140 is coupled between the node 138 and the output node 116 (as shown, the anode of the diode 140 is coupled to the node 138, and the cathode of the diode 140 is coupled to the output node 116), and a boost switch 142 is coupled between the node 138 and reference node 112. In an exemplary embodiment, the boost switch 142 is realized as a semiconductor device, preferably, an insulated-gate bipolar transistor (IGBT). The boost converter 106 is activated by modulating the boost switch 142 at a duty cycle to provide a voltage at the output node 116, relative to reference node 112, which is greater than the voltage at the input node 114, relative to reference node 112.

As shown in FIG. 1, in an exemplary embodiment, the inductive element 136 is realized as an inductor configured as the primary winding for transformer 124. In other words, the primary winding of the transformer 124 is coupled between the input node 114 and node 138. In an exemplary embodiment, when switch 134 is closed, the boost switch 142 is modulated (i.e., opened and closed) at a variable duty cycle which varies the current through the inductive element 136, and thereby determines the voltage at the output node 116, as will be appreciated in the art. At the same time, the varying current through inductive element 136 (i.e., the primary winding of transformer 124) also induces voltage in the secondary winding 144 of the transformer 124. That is, the duty cycle at which boost switch 142 is modulated also determines and/or controls the amount of voltage induced in the secondary winding 144 and seen at the input 125 of the voltage converter 108.

In an exemplary embodiment, the voltage converter 108 operates as a step-down DC to DC converter or buck converter. In accordance with one embodiment, the voltage converter 108 is configured to support bi-directional operation between the input 125 and the output 127, as described in greater detail below. In this regard, the second winding 144 of the transformer 124 is coupled between a first node 126 and a second node 127. A first inductor 146 is coupled between the first node 126 and a third node 128 and a first switch 150 is coupled between the first node 126 and a fourth node 129. A second inductor 148 is coupled between the second node 127 and the third node 128 and a second switch 152 is coupled between the second node 127 and the fourth node 129. A capacitor 154 is coupled between the third node 128 and the fourth node 129. In an exemplary embodiment, the switches 150, 152 are realized as semiconductor devices, preferably, metal-oxide-semiconductor field-effect transistors (MOSFETs).

Depending on the embodiment, the third energy source 130 may be realized as a battery, a fuel cell (or fuel cell stack), one or more capacitors (e.g., an ultracapacitor or capacitor bank), or another suitable voltage source. For the implementation described here, the third energy source 130 has a voltage less than voltage of the first energy source 104. In this regard, the transformer 124 is configured such that the induced voltage at the input 125 of the voltage converter 108 is less than the voltage at the output node 116 of the boost converter 106. For example, the transformer 124 may be configured such that the number of turns comprising the first winding 136 is greater than the number of turns comprising second winding 144, as will be appreciated in the art. In an exemplary embodiment, the ratio of the number of turns in the first winding 136 to the number of turns in the second winding 144 (i.e., the turns ratio for transformer 124) is approximately five to one, although in practice, the turns ratio may vary from one to one to twenty to one, and possibly higher, depending on the requirements for the specific application and the respective voltage levels of energy sources 104, 130.

In accordance with one embodiment, the third energy source 130 is realized as a 12 volt battery (or any suitable voltage associated with accessories, auxiliary loads, or relatively low voltage requirements of the vehicle 102). In an exemplary embodiment, third energy source 130 is capable of providing power to the auxiliary load 132, which may be realized as a 12 volt electrical subsystem within the vehicle 102. In alternative embodiments, the auxiliary load 132 may be absent, and the third energy source 130 used primarily for energy storage or jump starting and/or operating the vehicle traction system 122 as described below.

Depending on the embodiment, the controller 110 may be realized as software, hardware, firmware, and/or a combination thereof. As shown in FIG. 1, the controller 110 is coupled to the boost converter 106, voltage converter 108 and switch 134. In alternative embodiments, the controller 110 may be subdivided and/or realized using distinct individual components for performing the individual functions described herein. Further, the controller 110 may be integral with another module within the vehicle 102, such as an electronic control unit (ECU).

In a normal operating mode for the electrical system 100, the controller 110 is configured to close switch 134 and modulate the boost switch 142 at a duty cycle to provide an energy potential to the output node 116. Preferably, the switch 134 is realized as a mechanical switching device, such as a contactor or relay, because of the potentially high voltage levels within the electrical system 100. In accordance with one embodiment, the boost switch 142 is modulated at a duty cycle chosen such that the voltage at the output node 116 is substantially equal to the voltage of the second energy source 118. Although not illustrated, the vehicle traction system 122 is preferably realized as a power inverter coupled to an electric motor. The power inverter is configured to convert direct current from the output node 116 into alternating current to drive the electric motor in a conventional manner. Depending on the instantaneous power consumption of the vehicle traction system 122, the second energy source 118 may discharge energy or absorb energy (e.g., recharged) from the first energy source 104 during operation of electrical system 100.

When the switch 134 is closed, modulating boost switch 142 also induces a voltage in the second winding 144, and thereby provides a voltage at the input 125 of the voltage converter 108. In an exemplary embodiment, the controller 110 is configured to operate the switches 150, 152 of the voltage converter 108 such that the voltage at the output 127 (i.e., between nodes 128, 129) is substantially equal to the voltage of the third energy source 130. In this regard, at high voltage levels at the input 125, the controller 110 is configured to operate the voltage converter 108 in discontinuous mode in order to regulate the voltage at the output 127 to that of the third energy source 130.

In some situations during operation of the electrical system 100, it may be necessary or desirable to provide power to the second energy source 118 and/or vehicle traction system 122 from the third energy source 130. For example, the first energy source 104 and second energy source 118 may be unable to provide the amount of current and/or power necessary to start the vehicle traction system 122. In an exemplary embodiment, the controller 110 is configured to open the switch 134 and activate the boost converter 106 by modulating the boost switch 142 to provide energy from the third energy source 130 to the vehicle traction system 122 and/or second energy source 118. In this regard, the controller 110 may operate (i.e., open and/or close) the switches 150, 152 to vary the current through the secondary winding 144 and/or regulate the voltage at the input 125. Varying current through the secondary winding 144 induces a voltage in the primary winding 136, which may then be transferred to the output node 116 based on the modulation of boost switch 142. As illustrated in FIG. 1, the anode of the diode 135 is coupled to the reference node 112 and the cathode of the diode 135 is coupled to the input node 114 to allow current to flow through the boost converter 106 when the switch 134 is open.

In an exemplary embodiment, a diode 156 is coupled between the reference node 112 and node 138 to allow the capacitor 121 to be precharged to the voltage level of the first energy source 104 before the switch 134 is closed. As illustrated in FIG. 1, the anode of the diode 156 is coupled to the reference node 112 and the cathode of the diode 135 is coupled to node 138 to allow current to flow through the capacitor 121 and/or boost converter 106 when the switch 134 is open. For example, during startup of the electrical system 100, the voltage converter 108 (e.g., switches 150 and 152) may be operated in a manner that allows the capacitor 121 to be charged using the transformer 124. In this regard, the diode 156, primary winding 136, and capacitor 121 function as a rectifier for controlling the voltage potential between input node 114 and reference node 112. In accordance with one embodiment, the controller 110 may be configured to operate voltage converter 108 such that the voltage potential between input node 114 and reference node 112 (e.g., the voltage stored in capacitor 121) is substantially equal to the voltage of the first energy source 104. The controller 110 may determine when the voltage potential between input node 114 and reference node 112 is substantially equal to the voltage of the first energy source 104 and close switch 134 in response. By precharging the capacitor 121, the switch 134 may be closed with little or no resulting inrush current. In accordance with one embodiment, once the vehicle traction system 122 is jump started, the controller 110 may be configured to precharge the capacitor 121 and close switch 134 in order to return to the normal operating mode.

One advantage of the systems and/or methods described above is that an automotive electrical system may be realized using fewer components by sharing a transformer and boost switch between the two converters. In contrast, most conventional designs, for example, utilize separate circuitry for providing individual features and functions similar to those described herein (e.g., transferring power from a fuel cell to a high-voltage battery, transferring power from a fuel cell to a 12 volt battery, precharging the capacitor, charging the high voltage battery using a low voltage battery for jump starting). The electrical system described herein integrates these features and functionality while at the same time achieving volume, mass, and cost reductions.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An electrical system for use in a vehicle, the electrical system comprising:
   a transformer having a first winding and a second winding;
   a boost converter comprising:
      an input node, an output node, a first reference node, and a second reference node, wherein the first winding of the transformer is coupled between the input node and the first reference node;
      a first switch coupled between the first reference node and the second reference node; and
      a first diode coupled between the first reference node and the output node;
   a first energy source coupled between the input node and the second reference node, the first energy source having a first voltage;
   a first electrical load coupled between the output node and the second reference node;
   a bi-directional voltage converter having an input and an output, wherein the input is coupled to the second winding; and
   a second electrical load coupled to the output of the bi-directional voltage converter, wherein the first energy source provides energy to the first electrical load and the second electrical load when the first switch is modulated.

2. The electrical system of claim 1, wherein the first electrical load comprises a second energy source having a second voltage that is greater than the first voltage.

3. The electrical system of claim 2, further comprising a controller coupled to the first switch, the controller being configured to activate the first switch at a duty cycle to produce the second voltage between the output node and the second reference node.

4. The electrical system of claim 1, wherein the bi-directional voltage converter is a buck converter.

5. The electrical system of claim 1, wherein:
   the bi-directional voltage converter comprises a converter output;
   the second electrical load comprises a third energy source coupled to the converter output; and
   the third energy source has a third voltage that is less than the first voltage.

6. The electrical system of claim 5, further comprising:
   a second switch coupled between the first energy source and the input node;
   a second diode coupled between the second reference node and the input node, the second diode being configured to allow current flow from the second reference node to the input node; and
   a controller coupled to the first switch and the second switch, the controller being configured to:
      open the second switch; and
      activate the first switch to provide energy from the third energy source to the first electrical load.

7. The electrical system of claim 1, wherein:
   the first winding has a first number of turns;
   the second winding has a second number of turns; and
   the ratio of the first number of turns to the second number of turns is approximately five to one.

8. An automotive electrical system, the automotive electrical system comprising:
   a boost converter comprising an input, an output, and an inductor configured as a primary winding for a transformer;
   a first energy source coupled to the input of the boost converter;
   a bi-directional voltage converter having an input, the input of the bi-directional voltage converter being coupled to a secondary winding of the transformer; and
   a controller coupled to the boost converter, the controller being configured to activate the boost converter to provide energy potential from the first energy source to the output of the boost converter, wherein the first energy source also provides energy potential to the input of the bi-directional voltage converter.

9. The automotive electrical system of claim 8, the bi-directional voltage converter having an output, wherein the automotive electrical system further comprises a battery coupled to the output of the bi-directional voltage converter, the battery having a voltage suitable for powering an auxiliary electrical system.

10. The automotive electrical system of claim 9, further comprising a high-voltage battery coupled to the output of the boost converter.

11. The automotive electrical system of claim 10, wherein the high-voltage battery has a voltage greater than approximately 300 volts.

12. The automotive electrical system of claim 8, further comprising a vehicle traction system coupled to the output of the boost converter.

13. The automotive electrical system of claim 12, further comprising:
  a battery coupled to an output of the bi-directional voltage converter; and
  a switch coupled between the first energy source and the input of the boost converter, wherein the controller is coupled to the switch and configured to:
    open the switch; and
    activate the boost converter to provide energy from the battery to the vehicle traction system.

14. The automotive electrical system of claim 8, wherein the first energy source comprises a fuel cell.

15. An automotive drive system comprising:
  a first reference node;
  a boost converter having an input node, a second reference node, and an output node, the boost converter including:
    an inductive element coupled between the input node and the second reference node, wherein the inductive element is configured as a primary winding for a transformer;
    a first switch coupled between the second reference node and the first reference node; and
    a first diode coupled between the second reference node and the output node;
  a fuel cell coupled between the input node and the first reference node, the fuel cell having a first voltage;
  a vehicle traction system coupled between the output node and the first reference node;
  a buck converter having an input and an output, wherein the input is coupled to a secondary winding of the transformer;
  a battery coupled to the output of the buck converter;
  a high-voltage battery coupled between the output node and the first reference node;
  a second switch coupled between the first energy source and the input node; and
  a controller coupled to the first switch and the second switch, the controller being configured to:
    open the second switch;
    activate the first switch to provide energy from the battery to the vehicle traction system in order to start the vehicle traction system when the second switch is open;
    close the second switch; and
    activate the first switch to provide energy from the fuel cell to the vehicle traction system and the battery when the second switch is closed.

16. An automotive electrical system, the automotive electrical system comprising:
  a boost converter comprising an input, an output, and an inductor configured as a primary winding for a transformer;
  a switch coupled between the input of the boost converter and a first energy source;
  a bi-directional voltage converter having an input and an output, the input of the bi-directional voltage converter being coupled to a secondary winding of the transformer; and
  a controller coupled to the boost converter and the switch, wherein the controller is configured to:
    open the switch;
    operate the bi-directional voltage converter to provide energy from the output of the bi-directional voltage converter to the output of the boost converter when the switch is open;
    close the switch; and
    when the switch is closed, activate the boost converter to provide energy potential from the first energy source to the output of the boost converter, wherein the first energy source also provides energy potential to the input of the bi-directional voltage converter.

17. An electrical system for use in a vehicle, the electrical system comprising:
  a transformer having a first winding and a second winding;
  a boost converter comprising:
    an input node, an output node, a first reference node, and a second reference node, wherein the first winding of the transformer is coupled between the input node and the first reference node;
    a first switch coupled between the first reference node and the second reference node; and
    a first diode coupled between the first reference node and the output node;
  a first electrical load coupled between the output node and the second reference node;
  a bi-directional voltage converter having an input and an output, wherein the input is coupled to the second winding;
  a second electrical load coupled to the output of the voltage converter; and
  a controller coupled to the first switch, wherein the controller is configured to activate the first switch to provide energy from the input node to the first electrical load and the second electrical load.

* * * * *